United States Patent
Bhalodia et al.

(10) Patent No.: US 11,829,930 B2
(45) Date of Patent: Nov. 28, 2023

(54) SYSTEMS AND METHODS FOR CONTROLLING OPERATION OF AN ARTICLE BASED ON DETECTION OF AN INTERACTION EVENT

(71) Applicant: InstrumentMail, LLC, San Francisco, CA (US)

(72) Inventors: Vimal Bhalodia, East Hanover, NJ (US); Robb Walters, San Francisco, CA (US); Stuart Alexander Jacobson, San Francisco, CA (US)

(73) Assignee: InstrumentMail, LLC, San Francisco, CA (US)

( * ) Notice: Subject to any disclaimer, the term of this patent is extended or adjusted under 35 U.S.C. 154(b) by 71 days.

(21) Appl. No.: 16/841,607

(22) Filed: Apr. 6, 2020

(65) Prior Publication Data

US 2020/0302384 A1    Sep. 24, 2020

Related U.S. Application Data

(63) Continuation of application No. 14/639,983, filed on Mar. 5, 2015, now abandoned.

(Continued)

(51) Int. Cl.
| | |
|---|---|
| *G06Q 10/0833* | (2023.01) |
| *H04W 4/029* | (2018.01) |
| *G06Q 30/06* | (2023.01) |
| *G06Q 30/0601* | (2023.01) |
| *G08C 17/02* | (2006.01) |

(Continued)

(52) U.S. Cl.
CPC ..... *G06Q 10/0833* (2013.01); *G06Q 10/0832* (2013.01); *G06Q 20/14* (2013.01); *G06Q 20/40* (2013.01); *G06Q 30/06* (2013.01); *G06Q 30/0605* (2013.01); *G08C 17/02* (2013.01); *H04W 4/029* (2018.02); *H04W 12/06* (2013.01); *G08C 2201/20* (2013.01); *G08C 2201/60* (2013.01); *H04W 4/23* (2018.02); *Y02D 30/70* (2020.08)

(58) Field of Classification Search
CPC ............ G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

| | | |
|---|---|---|
| 8,533,075 B1 | 9/2013 | Sayers, III et al. |
| 10,074,247 B1 | 9/2018 | Tang et al. |
| | (Continued) | |

FOREIGN PATENT DOCUMENTS

| | | | |
|---|---|---|---|
| GB | 2483474 A | 3/2012 | |
| WO | 2011/096813 A1 | 8/2011 | |
| WO | WO-2011096813 A1 * | 8/2011 | ............. E05B 47/00 |

OTHER PUBLICATIONS

Švadlenka, Libor. "RFID in postal and courier services." by Prasad, BVS, Kalai, S. Supply Chain Management in Services Industry: an introduction, (2007): 68-74. (Year: 2007).*

*Primary Examiner* — Emmett K. Walsh
(74) *Attorney, Agent, or Firm* — Polsinelli

(57) ABSTRACT

Disclosed herein are systems, methods, and non-transitory computer-readable storage media for detecting events occurring to an article at a remote location using low-power event detection circuitry and transmission of event detection messages over a network.

20 Claims, 10 Drawing Sheets

Related U.S. Application Data

(60) Provisional application No. 61/949,935, filed on Mar. 7, 2014, provisional application No. 62/040,966, filed on Aug. 22, 2014.

(51) Int. Cl.

| | | |
|---|---|---|
| *H04W 12/06* | (2021.01) | |
| *G06Q 10/0832* | (2023.01) | |
| *G06Q 20/14* | (2012.01) | |
| *G06Q 20/40* | (2012.01) | |
| *H04W 4/23* | (2018.01) | |

(56) References Cited

U.S. PATENT DOCUMENTS

| | | |
|---|---|---|
| 2003/0212768 A1 | 11/2003 | Sullivan |
| 2005/0236479 A1 | 10/2005 | Schmidtberg et al. |
| 2006/0125642 A1 | 6/2006 | Chandaria |
| 2007/0115128 A1 | 5/2007 | Napolitano |
| 2007/0241889 A1 | 10/2007 | Kopp |
| 2008/0007398 A1 | 1/2008 | DeRose et al. |
| 2008/0186163 A1 | 8/2008 | Mills |
| 2009/0228343 A1 | 9/2009 | Ford et al. |
| 2009/0309722 A1 | 12/2009 | Nichols et al. |
| 2009/0315765 A1 | 12/2009 | Chen |
| 2010/0176919 A1* | 7/2010 | Myers ............... G07C 9/00857 340/5.2 |
| 2011/0022533 A1 | 1/2011 | Lau et al. |
| 2011/0050423 A1* | 3/2011 | Cova .................... G06Q 10/08 705/333 |
| 2011/0077909 A1 | 3/2011 | Gregory et al. |
| 2011/0145162 A1 | 6/2011 | Vock et al. |
| 2011/0231236 A1 | 9/2011 | Gonzalez |
| 2012/0023555 A1 | 1/2012 | Putterman |
| 2012/0259920 A1 | 10/2012 | Bertrand et al. |
| 2012/0315955 A1 | 12/2012 | Chandaria |
| 2013/0048717 A1 | 2/2013 | Brendell et al. |
| 2013/0135083 A1 | 5/2013 | Chang et al. |
| 2013/0151434 A1 | 6/2013 | Chandaria |
| 2013/0194926 A1 | 8/2013 | DeCusatis et al. |
| 2013/0222116 A1* | 8/2013 | Barry, III ............ G06Q 10/087 340/10.1 |
| 2013/0324148 A1 | 12/2013 | Geib et al. |
| 2014/0018100 A1 | 1/2014 | Yamada et al. |
| 2014/0279596 A1* | 9/2014 | Waris ................ G06Q 10/08355 705/317 |
| 2014/0288868 A1 | 9/2014 | Gorham |
| 2014/0297487 A1 | 10/2014 | Bashkin |
| 2014/0302842 A1 | 10/2014 | Lloyd et al. |
| 2015/0012457 A1 | 1/2015 | Gonzalez et al. |
| 2015/0100514 A1 | 1/2015 | Parris |
| 2015/0046364 A1 | 2/2015 | Kriss |
| 2015/0055686 A1 | 2/2015 | Hryciuk et al. |
| 2015/0112785 A1 | 4/2015 | Sharan |
| 2015/0189504 A1 | 7/2015 | Chew |
| 2015/0255111 A1 | 9/2015 | Grasso |
| 2015/0269518 A1 | 9/2015 | Gray |
| 2015/0359127 A1 | 12/2015 | Daoura et al. |

* cited by examiner

SYSTEMS AND METHODS FOR CONTROLLING OPERATION OF AN ARTICLE BASED ON DETECTION OF AN INTERACTION EVENT

CROSS REFERENCE TO RELATED APPLICATIONS

This application is a continuation of U.S. patent application Ser. No. 14/639,983, filed Mar. 5, 2015, which claims benefit of U.S. Provisional Patent Application No. 61/949,935, filed Mar. 7, 2014 and to U.S. Provisional Patent Application No. 62/040,966, filed Aug. 22, 2014 of which are incorporated by reference herein in their entireties.

BACKGROUND

1. Technical Field

The present technology relates to the field of networking and consumer electronics, and more specifically, to systems and methods for enabling interactions with consumers and consumer articles, such as a package, via telecommunications networks.

2. Introduction

Presently, tracking events remotely involves humans manually noting that an event occurred. For example, a receptionist can sign for a package and the courier can send a confirmation to the sender of the package that the package was received. However, the sender never actually knows that the package was opened. Likewise, consumer goods (e.g. medicine containers, tires, light bulbs, etc.) are passive and require a human to report that they need replacement or servicing. More advanced systems and methods are required to detect events at remote locations.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for more advanced approaches for detecting events at remote locations. Systems, methods, and computer-readable media are disclosed which detect events occurring to an article at a remote location. The technology can involve integrating communication system within an article or package. The communication system can include a memory, a low-power power source, a sensor for detecting an interaction event with the article, a microcontroller coupled with the sensor, and a communication interface coupled with the microcontroller. The communication system can be associated with a telecommunication network (cellular network, mobile virtual network operator network (MVNO), pager network, long range radio network, ad-hoc event detection network, etc.) and can be assigned a network identifier and an article identified.

When the article or package is sent to a remote location and the sensor detects a predetermined event (opening the package, detecting a threshold luminosity, detecting a threshold pressure) the communication system can send a message over the telecommunication network that includes the network identifier, the article identifier, and location information (e.g. cell tower location).

The technology can further involve an operating server (e.g. a server operated by an interchange entity such as an MVNO) receiving the message and recording the occurrence of the event at the location it occurred. The interchange entity can also provision article identifiers for tracking articles and packages. Similarly, the interchange entity can acquire bulk bandwidth for communicating over the telecommunication network and can provision articles and packages with network identifiers associated with a portion of the bandwidth to allow the telecommunication network to permit messages to be sent to the operating servers.

In the following description, for the purposes of explanation, numerous specific details are set forth in order to provide a thorough understanding of the present technology. It will be apparent, however, that the present technology may be practiced without these specific details. In other instances, well-known structures and devices are shown in block diagram form in order to avoid unnecessarily obscuring the present technology.

Figure 1:
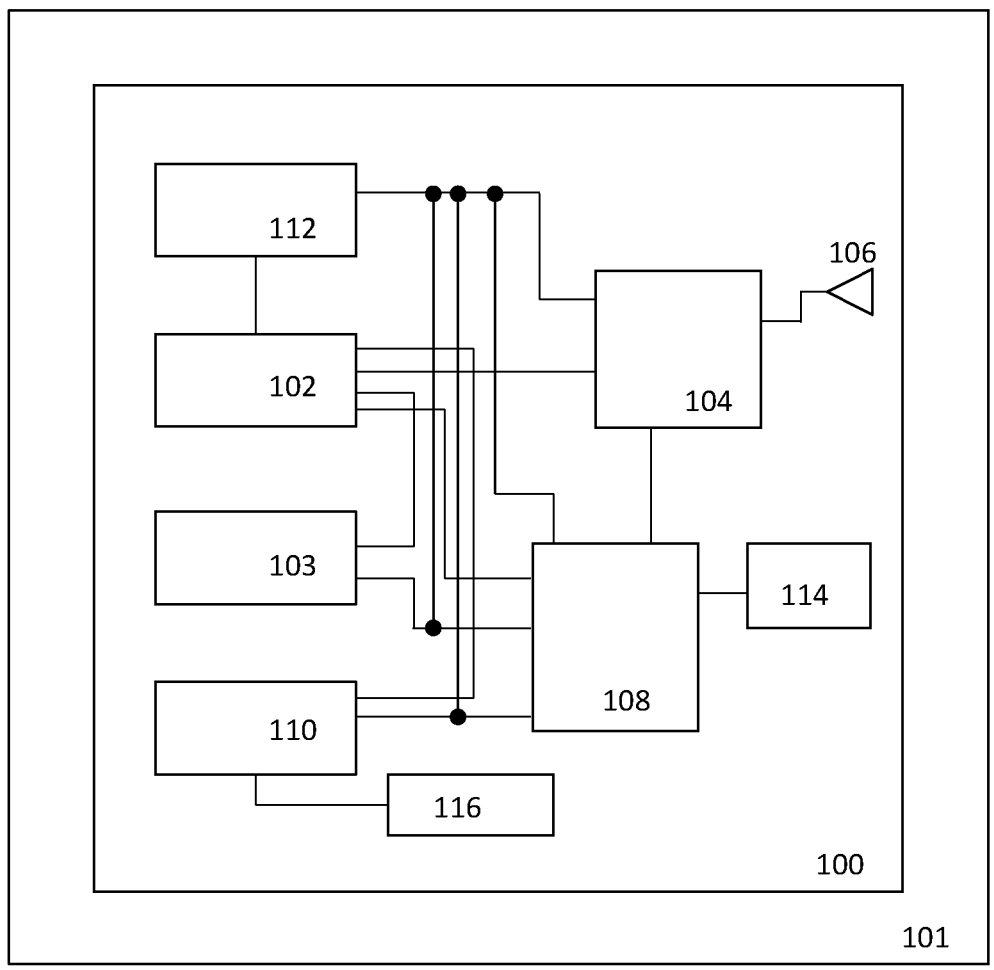
FIG. 1 schematically illustrates an event detection and remote communications device embedded in an article, in accordance with some embodiments of the present technology.

FIG. 1 illustrates an event detection system 100 for providing event detection data relating to a consumer article over a network according to some embodiments of the present technology. The event detection system 100 can be coupled with an article 101, such as, for example, a package. Other examples of an article include envelopes, paper, books, magazines, shipping packages, package wrapping, gift wrapping, consumable items, price tags, price labels, theft-deterrent devices, inhalers, tires, clothing material, clothing tags, clothing labels, computing devices, consumer devices, such as an LED or other light-emitting fixture, disposables such as bottles or other containers for food products, liquids, toiletries, or other replenishables or perishables, off-the-shelf sensors such as temperature sensors or light sensors, automotive goods such as tires, batteries, and auto parts, or any portable object.

The event detection system 100 can also include a power source 102, a sensor 103, a communication system 104, an antenna 106, a microprocessor 108, and memory 114. The event detection system 100 can also include additional power storage 112, an actuator 110, and other mechanisms 116. The components of the event detection system 100 shown in FIG. 1 and similar components are explained in more detail below.

In some embodiments, the event detection system 100 may be housed on a substrate or within one or more substrates. The substrates can be attached to or enclosed within packages or other consumer articles. The substrates can be distinct from the packages and can be integrated within the packages. Examples of packages on which the event detection system 100 could be attached include paper-based packages such as envelopes, printed materials such as menus, or packaging such as pizza boxes. A variety of other packages and consumer articles can be benefit from the present technology and a number of types of packages and articles are mentioned explicitly in this disclosure. However, those with ordinary skill in the art having the benefit of this disclosure will readily appreciate that a wide variety of packages and articles can be used with the present technology.

n some embodiments, the event detection system 100 is implemented in one or more integrated circuits, which may include silicon-based integrated circuits, and in which the event detection system 100 may be attached to the packages via an adherent. The event detection system 100 can be enclosed within the package, such as, by way of illustrative example but not limitation, an envelope or pizza box. In some embodiments, the electronics comprising the event detection system 100 may be deposited, in whole or in part, on the medium of the package itself. For instance, the components of the event detection system 100 may be instantiated directly on a paper-based medium, such as an envelope or cardboard box.

In embodiments of the present technology, the event detection system 100 is substantially visually indistinguishable from the medium in which it is embedded or attached. For example, when the event detection system 100 attached to or embedded in a paper envelope, the event detection system 100 may be visually indistinguishable to viewers from the paper of the envelope. It will be understood by those skilled in the art that the technology can be practiced on media that are durable rather than disposable, and that in alternative embodiments of the present technology, the features of the present technology described herein are implemented in durable materials, substrates, or other non-disposable media.

As explained above, the event detection system 100 includes a power source 102. In embodiments of the technology, the power source 102 is an ambient power source, which receives and converts energy from the surrounding environment. For example, the ambient power source may be a photo-voltaic detector. In other embodiments, the power source 102 may obtain energy from radio waves or other electromagnetic spectrum. Ambient energy sources may include inductive power sources, such as those powering RFID readers.

Also some embodiments of the present technology can involve using thermal power, such as from body heat, or ambient kinetic energy, such as from the motion of a user or recipient of the package. Alternative forms of ambient energy that can be utilized to supply power to the event detection system 100 will be apparent to those skilled in the art.

In some embodiments, the power source 102 can be a lightweight battery. Certain embodiments may utilize a capacitor for energy storage. For example, a supercapacitor may be utilized. In some embodiments, the capacitors or battery may be on a separate substrate from the event detection system; in other embodiments, the capacitor or battery may be implemented within the physical medium of the event detection system, such as in paper on a paper-based package.

In other embodiments, there is no battery or power storage in the event detection system, and all power is received through ambient sources. Some embodiments of the present technology include additional secondary power storage 112 that is separate from the original power source; in some such embodiments, the secondary power storage 112 collects power from a primary power source 102 from time-to-time, or on a periodic basis.

In embodiments of the present technology, the power source 102 is utilized to provide a signal of an event to the event detection system 100, as described further in other sections of this written description. In embodiments of the present technology, the power source 102 is charged prior to delivery of the event detection system 100, so that the event detection system 100 is operable immediately without requiring power from an external source for initial communications to be conducted via the communications system 104.

As explained above, the event detection system 100 can include a communications system 104. In some embodiments of the present technology, the communications system 104 communicates over a long-distance wireless telecommunications system. For example, the wireless telecommunications system can be a pager network. In some embodiments of the present technology, the telecommunications system does not require a SIM card or other similar local network identifier to be included in the event detection system 100. Also, the wireless telecommunications system can be a cellular network, such as a TDMA, CDMA, LTE or GSM network. Other alternative wireless telecommunications systems that can be utilized with the present technology will be apparent to those skilled in the art. Additionally, the communications system 104 may communicate over a wireless local area network (e.g. 802.11 protocol). Other alternative wireless network systems that can be utilized with the present technology will be apparent to those skilled in the art.

In certain embodiments, the communications system 104 may include systems to communicate within close proximity to other devices, such as Near Field Communications (NFC), Bluetooth, or radio frequency identification (RFID) systems; other such systems for proximate communications will be apparent to those skilled in the art. The communications system 104 may include an antenna 106. In certain embodiments, the antenna 106 may be a strip line antenna; in certain embodiments, the antenna may be printed on the same medium as the package, such as paper. In some embodiments, the communications system 104 may include a Subscriber Identity Module (SIM) circuit. Alternative implementations of the communications system 104 that are operable at the voltages provided by the power source 102 will be apparent to those skilled in the art.

In embodiments, the event detection system 100 includes a low power microcontroller/microprocessor 108, which is operable under the power provided by the power source. For example, the microcontroller 108 may constitute an 8-bit microcontroller; however, in other cases, higher-bit microcontrollers may be utilized. The microcontroller 108 will be operable at a power and voltage that can be supplied by the power source 102. In some such embodiments, the microcontroller 108 is in communication with solid state, low-power non-volatile memory 114 that can be embedded on the substrate, and that is operable at the power and voltage that can be supplied by the power source 102. The non-volatile memory 114 may in embodiments, be readable, programmable, or read/writeable. Suitable forms of non-volatile memory 114 will be apparent to those skilled in the art. In embodiments of the present technology, the digital components of the event detection system 100 are coupled over one or more communications buses; in some such embodiments, such one or more communications buses may be embedded in a common substrate with other components of the event detection system 100.

The microcontroller 108 will also be configured to operate the communications system 104, in response to events detected by the event detection system 100. In some embodiments, the power source 102 also serves as a sensor that detects events which are reported to the microcontroller 108. As an illustrative, non-limiting example, the microcontroller 108 may be programmed to detect when a photo detector acts as a power source 102 in the event detection system 100 and receives light at a certain luminosity, and may be configured to send a signal via the telecommunications system 104 in response. In alternative embodiments, the event detection system 100 includes a sensor 103 that is separate from the power source 102, wherein the sensor 103 is in communication with the microcontroller! microprocessor 108, and the microcontroller! microprocessor 108 is operative to poll and respond events detected at the sensor 103. In some embodiments of the present technology, the event detection system 100 includes an on-board actuator 110 in communication with the microcontroller/microprocessor 108, to drive other mechanisms 116 that are coupled to the actuator 110, in response to commands received from the microcontroller! microprocessor 108. For example, the actuator 110 may be coupled to and operate an LED 116 attached to the event detection system 100. In some cases, the LED can be Organic LEDs (OLEDs) or quantum dots. Other examples of actuators that can be used in embodiments of the present technology will be apparent to those skilled in the art.

In some embodiments, the mechanism 116 may be a small, lightweight display, such as a liquid crystal display. In some such embodiments, the display 116 may be utilized to display a code, such as a QR code. In some embodiments, the mechanism 116 may be a speaker. In some such embodiments, the speaker may be utilized to issue an audible or inaudible sound that identifies the event detection system 100 or package 101.

In some embodiments, the actuator 110 and output mechanism 116 may also act as sensors 103; in some such embodiments, a speaker 116 may also be utilized as a microphone that provides input to the sensor 103/110, which translates the analog signal of the microphone into a digital signal for the microcontroller 108. Other mechanisms 116 attached to the packaged that maybe operated by the actuator 110 will be apparent to those skilled in the art. In some embodiments, the event detection system includes an actuator 110, but no sensor 103; in some such embodiments, the actuator 110 is responsive to signals received by the microprocessor/microcontroller 108 via the communication system 104.

Figure 2:
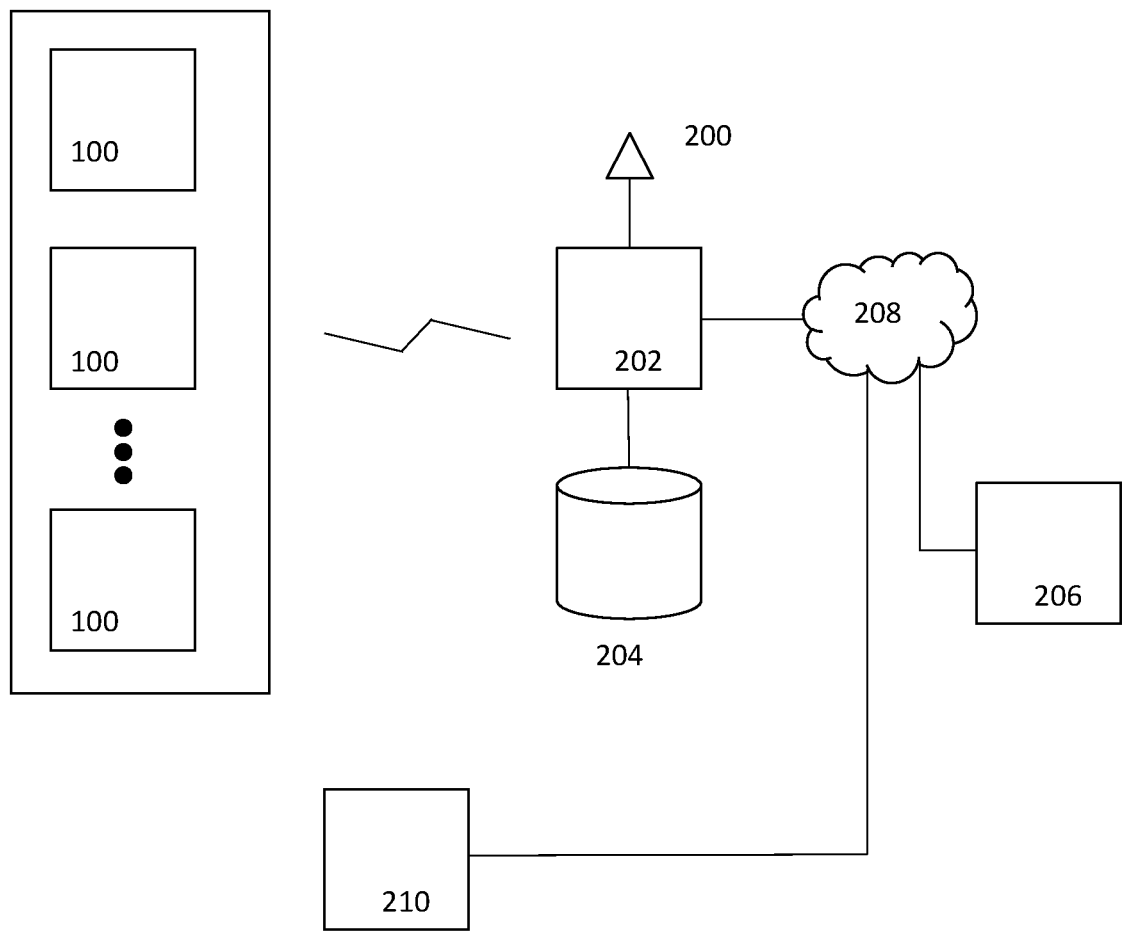
FIG. 2 illustrates network architecture for remote detection and operation of the article, in accordance with some embodiments of the present technology.
Figure 3:
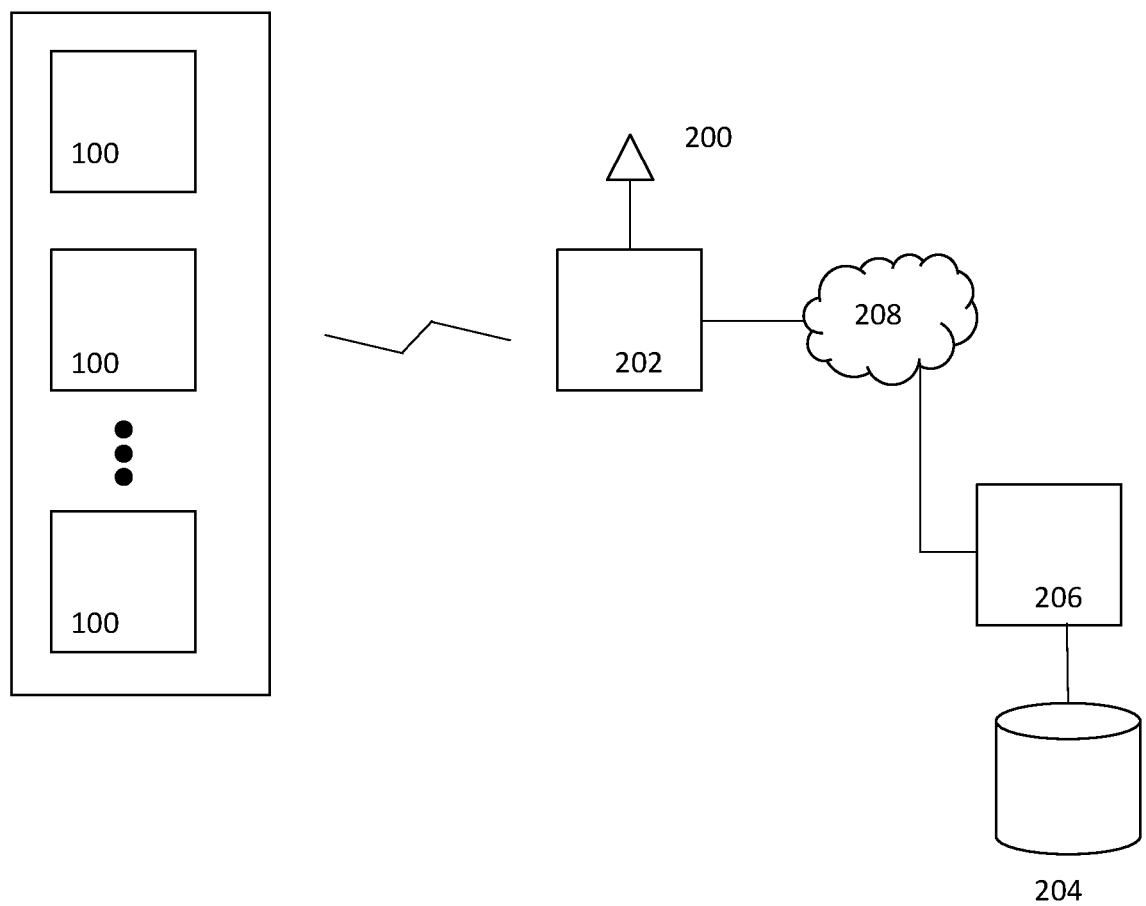
FIG. 3 illustrates network architecture for remote detection and operation of the article, in accordance with some embodiments of the present technology.

FIGS. 2 and 3 illustrate examples of communications networks used for remote interaction with articles containing event detection systems according to some embodiments of the present technology. As shown in FIGS. 2 and 3, multiple articles 299 containing event detection systems can communicate over long-distances over a long-range wireless communications system 200. For example, the wireless communications system 200 can be a pager network, a cellular network, or other wireless communications system, which is communicable via a lower power system, as discussed above. In some embodiments of the present technology, the wireless communications system 200 can include two or more wireless networks from different telecommunications services providers. For example, different telecommunications services providers and networks may be utilized for communications with the article 299 if the article 299 moves in and out of coverage, roams between networks, etc.

In some embodiments of the present technology, an article 299 can communicate with one or more communications servers 202. In some such embodiments the communications servers 202 are configured to identify one or more network identifiers associated with the article 299 via a device identification database 204 coupled locally to the communications servers 202. In some other embodiments, as depicted in FIG. 3, the identification database 204 is remote from the communications servers 202.

In embodiments, the communications servers 202 include protocol gateways for transforming messages received via the wireless communications system 200 to a packet based protocol for further distribution over the wide area network 208, as described below.

Embodiments of the present technology include one or more operating servers 206 for interacting with the articles 299; such interactions may include monitoring and/or operating the articles 299. In embodiments of the present technology, the operating servers 206 are in communication with the communications servers 202 via a wide area network 208, such as the Internet. Also, communications between the operating servers 206 and the articles 299 can be sent over a packet-switched protocol, such as or TCP/IP or UDP. In some embodiments, the packet-switched protocol is IPv4 or IPv6. Other packet-switched protocols that may be utilized for communications between the articles 299 and the operating services 206 shall be apparent to those skilled in the art. In some embodiments, the one or more operating servers 206 are in direct communication with the device identification database 204.

In some embodiments of the present technology, the communications system 104 associated with an article is configured not to search for cellular towers at periodic intervals; rather, the communications system 104 can be configured to send a burst communication to reach multiple cellular towers upon the occurrence of an interaction event upon which an individual message is to be sent. Also, the communications system 104 can be configured so that a message is held by the processor 108 and only sent by the communications system 104 once sufficient power is received/stored at the power source 102 to enable a one-time delivery of the message to the communications server 202 via the communications system 200.

In some embodiments of the present technology, an article is associated with one or more network identifiers. For example, the network identifiers can include an identifier on the telecommunications network 200, such as a telephone number. In some embodiments, the one or more network identifiers may include an identifier such as an IP address (such as an IPv4 or IPv6 address), a MAC address, or a universally unique identifier (UUID). Other examples of network identifiers associated with the articles will be apparent to those skilled in the art.

In embodiments of the present technology, a single article may include more than one event detection system 100 and each of the one or more event detection systems 100 shares one or more of the network identifiers. For example, an envelope may have two or more event detection systems 100, each of which has the same phone number. In some embodiments, the event detection systems 100 are authenticated to the communications server 202 only if all event detection systems 100 on the device report the same identifier.

In embodiments of the present technology, the identification database 204 maps the network identifiers to the one or more articles. In some embodiments, the identification database also records one or more individuals associated with an article. In embodiments, other personally identifying information may be included in the identification database 204, such as a postal address for the user, or to which a package is sent. Other examples of user or article information that may be stored in the identification database 204 shall be apparent to those skilled in the art.

The identification database can be an SQL database, a flat file, a CSV, or, distributed file system, etc. In certain embodiments, the identification database stores records in encrypted format. In some such embodiments, the encrypted records are only accessible by a user associated with the article. In certain embodiments, the user may access the identification database 204 via a web browser or other client application 210 in communication with the identification database 204 via the wide area network 208. In some embodiments, the client application 210 may be a mobile application that operates on a smartphone, tablet, or other mobile computing device. In some such embodiments, communication between the client 210 and the identification database 204 is over a secure protocol, such as, by way of example but not limitation, Secure Socket Layer; other suitable secure protocols will be readily apparent to those skilled in the art. In some embodiments, the identification database 204 and client 210 are configured to allow the user to set up a password unique to the user, which is required for operating the articles remotely.

Figure 4:
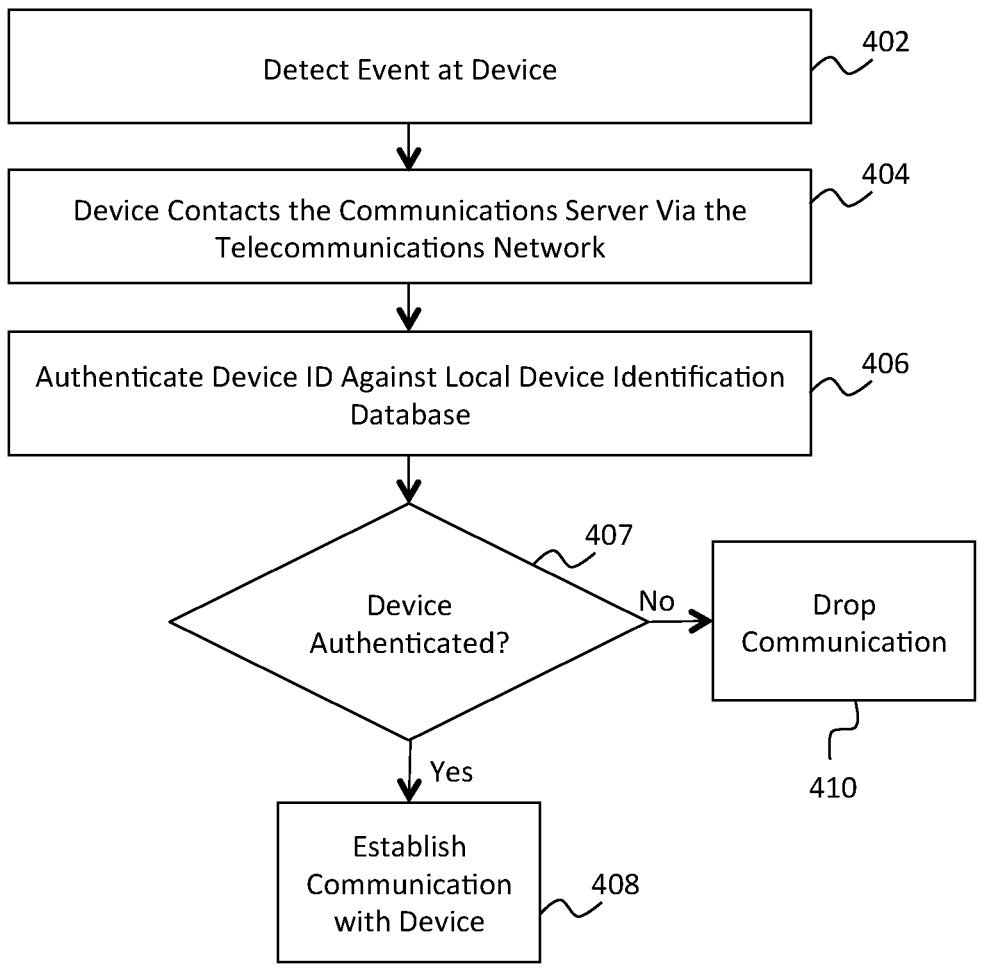
FIG. 4 is a flow chart for establishing communications with the article, in accordance with some embodiments of the present technology.

In certain embodiments, the network identifier of an article includes several more bits than necessary to uniquely identify the article, for purposes of security and/or error correction. In some such embodiments, the bits in the network identifier are randomized. In some embodiments, a plurality of event detection systems 100 on a single package include a common string in the network identifier, to indicate that such event detection systems 100 belong on a single package. In certain embodiments, the network identifier includes error correction, such as forward error correction, Hamming codes, or Reed-Solomon codes. Other methods of error correction or redundancy that may be applied to the network identifiers shall be readily apparent to those skilled in the art. In certain embodiments, the event detection system 100 may be communicated with by the operating server 206 via email, SMS, Twitter, or other text-based messaging systems. In some embodiments, the event detection system 100 is associated with a public key, for encrypting and authenticating keys FIG. 4 illustrates an example for authenticating packages or other articles containing communication systems according to some embodiments of the present technology. The method 400 can involve a communication system 100 detecting an event (e.g. interaction event) at an article 402. By way of example but not limitation, the event may be an initial detection that a threshold of energy has been received at the power source 102, or that another event has been detected at a sensor 103 separate from the power source 102. As a non-limiting example, the power source 102 may be a photo-diode, and the microcontroller 108 may be initially configured in a sleep state, and subsequently enclosed or embedded in an enclosed package, such as an envelope or cardboard box. The microcontroller 108 may be configured to wake when a power source 102 reaches a certain threshold of energy, such as, by way of example but not limitation, a certain luminosity arriving at the photo-diode by virtue of the enclosure being opened by an end user, or a certain current or voltage threshold being received or produced at the power source 102.

Alternatively, the event detection system 100 may be charged initially with power, and may be configured to periodically poll one or more ports or sensors 103 in order to determine if an event has occurred, such as the breaking of a circuit. As an illustrative, non-limiting example, the event detection system 100 could be enclosed in a package such as an envelope or box, and the event could be the breaking of a circuit, for example, when the enclosure is opened. Other examples of such triggering events will be apparent to those skilled in the art.

The method 400 also involves the article communicating 404 with the communication server 202 in response to the event, e.g. via a telecommunications system.

In some embodiments of the present technology, at the time that the article is deployed, bandwidth may be purchased from the providers of a telecommunications service, in order to allow the article communicate via the telecommunications service 200 automatically, for a minimum or perpetual subscription period. Alternatively, such connectivity may be purchased from the providers of the telecommunications service 200 in batches, allowing communication from the packages for limited periods of time.

Next, the method 400 involves, upon receipt of communication from the event detection system containing an identifier for the article, the communications server checking the identifier 406 against a local article identification database 204 to authenticate the identification of the article, and establish communication 408 with the article. If the article identifier is not authenticated 410, the communication is dropped. For example, if the identifier is not authenticated, such identifier may be placed on a blacklist in the local article identification database 204, so that future communications are not received from such article identifier.

Figure 5:
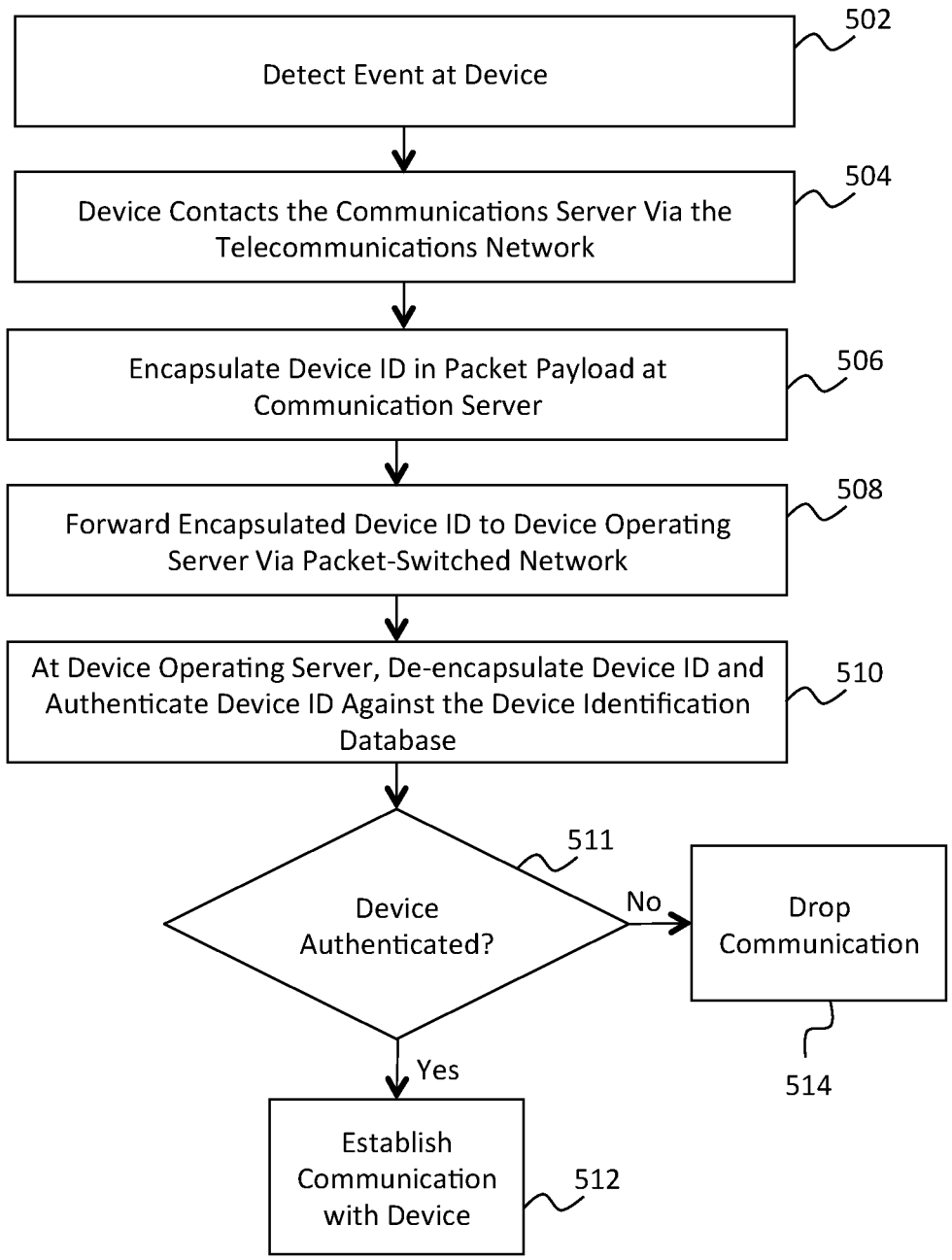
FIG. 5 is a flow chart for establishing communications with the article, in accordance with some embodiments of the present technology.

FIG. 5 illustrates an exemplary method 500 for authenticating an article with an article identification database 204 using an operating server 206 according to some embodiments of the present technology. In such embodiments, after the triggering event is detected 502 at the article, the article establishes communication 504 with the communications server via the communications network. The communications server then encapsulates one or more identifiers received from the article in one or more packet payloads 506. The communications server forwards the encapsulated packets to the operating server via the packet-switched network 508. In some embodiments, the encapsulated packet is forwarded to the operating server in an encrypted or secure form. In some such embodiments, such communications are conducted using a Secure Socket Layer protocol, and/or by use of the IPSec protocol suite; other alternative security protocols that can be utilized for communications between the communications server and the operating server will be apparent to those skilled in the art.

On receipt, the operating server de-encapsulates the article identifier, and authenticates 510 the article identifier against the article identifier database. Upon authentication, the operating server establishes 512 a session with the article (or alternatively, is now configured to accept and exchange asynchronous messages with the article) over a packet switched protocol, with such messages routed to the article via the communications server 202 and the telecommunications network. In embodiments of the present technology, subsequent communications between an operating server 206 and the article are conducted over a secure protocol, such as a Secure Socket Layer protocol, IPSec, etc. In some such embodiments, secure communications sessions are established between the article and the device operating server 206, so that such communications are not transparent to the communications servers 202.

In embodiments of the present technology, the operating server 206 collects and generates reports and/or performs analytics on data received from and about the article. In some embodiments, the operating server 206 sends commands to the article to operate the article. In some embodiments, the reports are delivered by the operating server 206 to the client application 210. In some embodiments, the client application 210 may also provide instructions to operate the article via the operating server 206. In some embodiments, a user of the article may be authenticated and authorized to operate the article and/or receive data from the article via the client 210.

In embodiments of the present technology, the functions and systems described above may be performed or operated, as applicable, by different entities. For example, one or more articles including an event detection system may be sent by or on behalf of one or more issuers to the end users. An issuer may utilize an interchange entity, such as for example, a telecommunications network provider, Mobile Virtual Network Operator (MVNO), a legacy network, such as a pager communication network, postal service, mail courier, retailer (storefront or online), delivery service, and the like for functions associated with the articles. In some such embodiments, the interchange is responsible for operating the operation servers 206. In some embodiments, the interchange creates, operates and maintains the article identification databases 204. In some embodiments, the interchange is responsible for the procurement of bandwidth from one or more telecommunications services providers of the telecommunications systems 200. e.g. when the communications servers are operated by the telecommunications services providers. In some embodiments, as depicted in FIG. 2, the article identifier database 204 is operated by the telecommunications services provider. Also, the article identifier database 204 is operated by the interchange, as shown in FIG. 3. Identifiers for the applicable issuer and interchange may be included in the communications system 104.

In some such embodiments, the interchange utilized for a package 101 is responsible for routing communications from an article to the appropriate issuers via the network identifier of the article. In some such embodiments, upon receiving or exchanging messages from or with an article, the interchange updates billing records associated with the issuer, or accounts payable to the telecommunications services provider. In some embodiments, the operation servers 206 may be operated or accessed by the issuer, and communications between the issuer and the articles are routed by the interchange to the appropriate telecommunications services provider by reference to the article/network identifiers. In some embodiments, an issuer may utilize different interchanges for communications with different articles or different types of articles. For example, an issuer may communicate with articles via different interchanges which are selected or determined based upon the geographical destination of the article or location of the intended user/consumer. Alternatively, interchanges may be selected or determined based on the bandwidth required for communication with the applicable article, the type of communications to be conducted with the articles, or the applications supported by the articles. Those with ordinary skill in the art having the benefit of this disclosure will readily appreciate that other a wide variety of criteria can be used for selection of interchanges.

In some embodiments of the present technology, the network identifier for an article is loaded on to the communications system 104 at the time the article or package is provisioned. For example, the identifier may be loaded in a SIM circuit in the communications system 104. The telecommunications provider can route traffic between the article and the article operating servers 206 that are operated by or on behalf of the issuer of the article or package, based on the network identifier for the article. When communications between the operating server 206 and the event detection system 100 are held over secure communication sessions, such communications will not be transparent to the telecommunications services provider.

Figure 9:
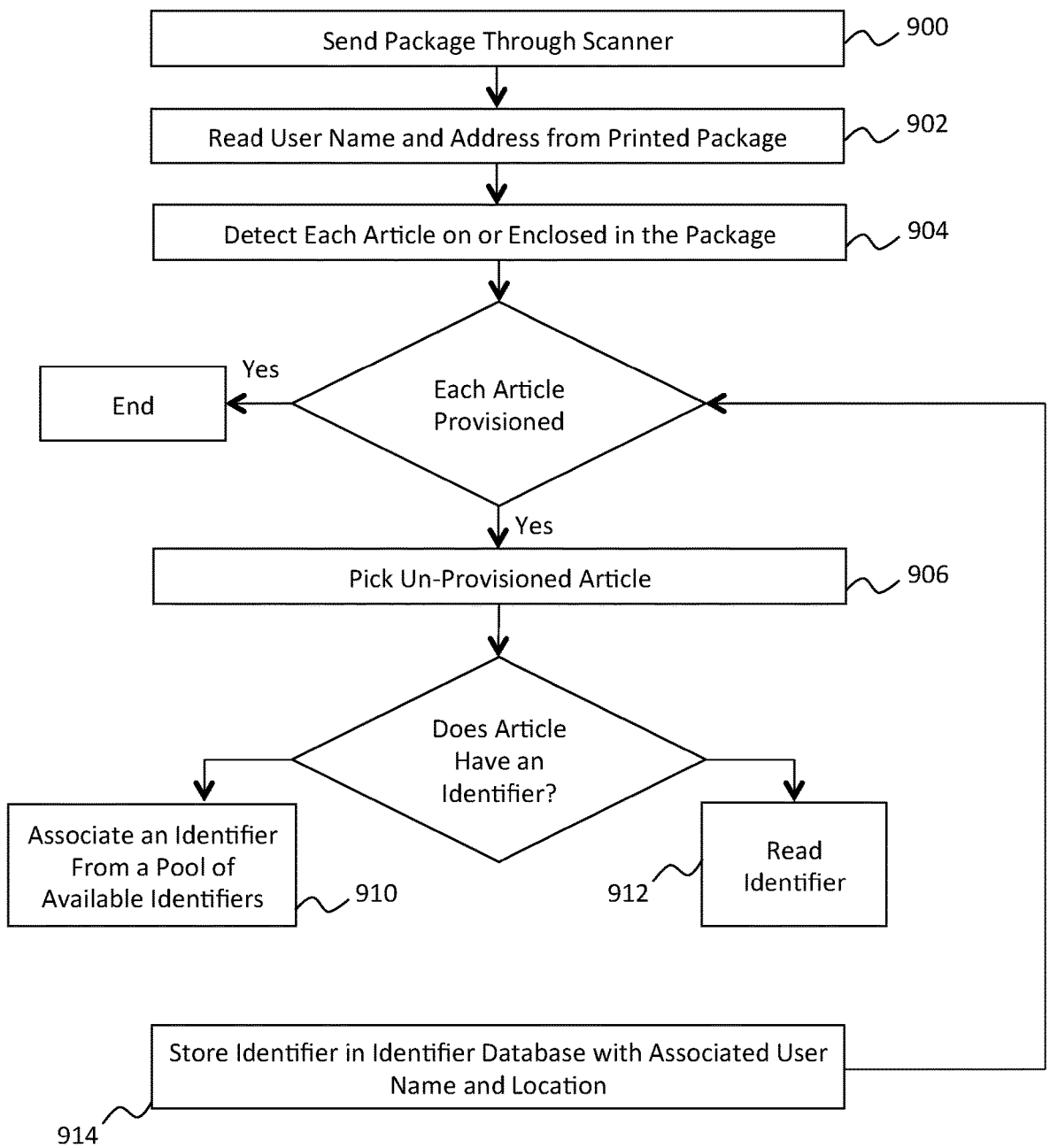
FIG. 9 is a flow chart for assigning network identifiers to articles in accordance with some embodiments of the present technology.

In embodiments of the present technology, the article identification database 204 is populated at the time the article and/or packages are provisioned. In some embodiments, as depicted in the flowchart in FIG. 9, at the time of provisioning, the package is sent 900 through an automated process whereby information printed on the package is read 902. For example, a reader reads such printed information via optical scanning. The printed information may be a name of an intended recipient of the package and a delivery address for the package. Thereafter, the articles that are enclosed in or attached to the package are detected 904. For any article that has not been provisioned in an article identification database 906, the article is read to see if it has an identifier encoded 908.

If not, an article identifier is selected from a pool of available identifiers and scanned onto the article 910. If there is an identifier on the article, that identifier is retrieved 912 and stored in the article identification database 204 along with the associated name and location of the intended package recipient 914.

In alternative embodiments, as will be apparent to those skilled in the art, the steps in the foregoing process may be conducted concurrently or in alternative orders. By way of example but not limitation, the article may be detected initially, with the label/delivery address placed on the package based on the identifier of the article. In other embodiments, the article is not scanned, but the article identifier may be known by virtue of an order in which the package was sent through the process. In some embodiments, the package may be initiated through the process without an identifier for the article or a package label, and both may be assigned to the article and its applicable package concurrently. Other variants will be apparent to those skilled in the art.

As will be apparent to those skilled in the art, the articles described herein can constitute a consumer device, such as an LED or other light bulb or fixture, disposables such as bottles or other containers for food products, liquids, toiletries, or other replenishables or perishables, off-the-shelf sensors such as temperature sensors or light sensors, automotive goods such as tires, batteries, or auto parts; additional examples are too numerous to mention, but will be readily apparent to those skilled in the art. Certain such media, or goods, have states to be monitored by either the user via a client 210, or by a vendor or other entity in communication with the article and event detection system 100 via an operating server 206.

In embodiments of the present technology, an article or package is monitored automatically and remotely via an operating server, without requiring provisioning or other manual intervention by the user. For example, an article may be a medicine bottle that is delivered to a user, whereby an event corresponds to detection of an amount of medicine remaining in the bottle. By way of illustration, the bottle may be configured such that multiple measurements, such as weight measurements, or detection of fluid levels, are taken by the event detection system 100, in order to determine robustly that an amount of medication has fallen below a defined threshold, with the multiple measurements taken in order to minimize false-positive results. In embodiments of the present technology, a delivery of refills for the medication is dispatched to the location of the bottle upon when notification of the threshold is received at the operating server, and a determination is made by the operating server that the result is robust and the medicine has definitively fallen below a designated threshold. For example, the medicine may be an inhaler, and the triggering event may be a determination of pressure in the inhaler, or detection of a certain gas mixture in the inhaler, indicating a need for replenishment. The foregoing information may also be correlated and stored with other medical records of the applicable users. Other examples of such replenishables shall be readily apparent to those skilled in the art.

The event detection system 100 may be used in conjunction with an automobile tire, and a triggering event can correspond, for example, to a dramatic pressure drop, and a message is sent by the event detection system 100 to an operating server indicating the drop in tire pressure and a geolocation of the automobile. In embodiments of the present technology, the power source 102 of the event detection system 100 is a separate power source from the car battery. For example, the power source may derive from heat sources or kinetic sources in the car, or from alternative redundant power sources in the car. In some such embodiments, the geolocation of the event detection system is separate from geolocation systems in the car or otherwise. For example, the geolocation data may be inferred from telecommunications networks 200 by which the event detection system 100 communicates. In embodiments of the present technology, upon detecting a catastrophic failure of the tire and receiving the geolocation of the automobile, an operating server can automatically dispatch service to the location of the event detection system 100. As will be apparent to one skilled in the art, the present technology can be similarly utilized for event detection system 100 included in an automobile battery, where the triggering event corresponds to a voltage indicating a battery failure. Other examples will be readily apparent to those skilled in the art.

Figure 10:
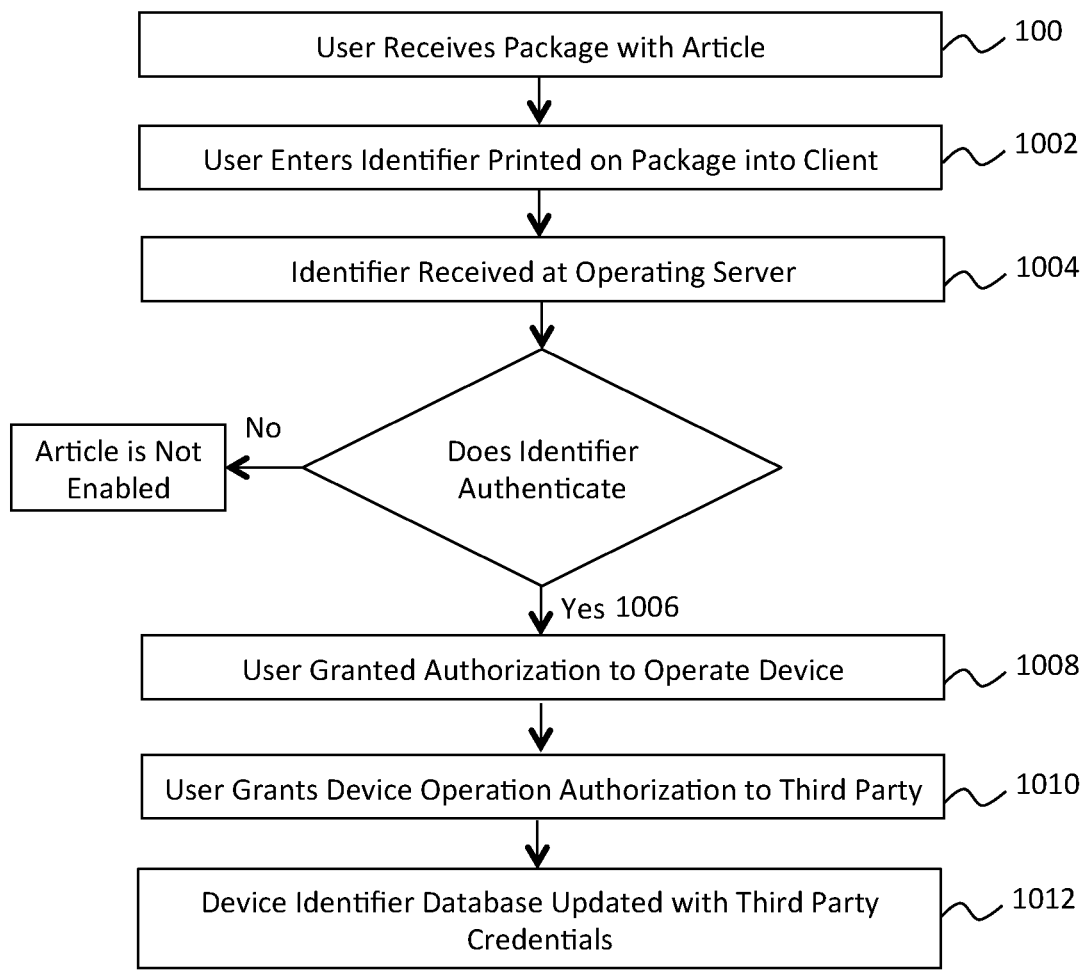
FIG. 10 is a flow chart for obtaining control of an article remotely in accordance with some embodiments of the present technology.

In some embodiments of the present technology, an article, package, and system are also remotely operable, by the user via the client 210, or by a third party via an operating server 206, as further depicted in the flowchart in FIG. 10 For example, a package may be a light source, such as an LED, whereby the light source is provisioned, prior to delivery to the user, with sufficient call-time to exchange messages via a wireless telecommunications network for the expected life of the product. In some such embodiments, the event detection system is bound by an identifier that is provided to the user. For example, the identifier may be included in packaging for the product. Alternatively, the product may be configured to communicate with a mobile device of the user via a near field protocol, such as NFC, and to be bound by an identifier set by the user. In some such embodiments, after receipt 1000 of the package the user may enter 1002 the article identifier/credentials included in the package into the client device. The user is then authenticated by an article operating server 206 by use of the credentials 1004. If the user is authenticated 1006, the user is then granted authorization 1008 to control the article or package, including rights to receive data from sensors 103 and control actuators 110. In some embodiments, the user is granted authority to remotely monitor and operate the article via the client 210. In embodiments of the present technology, after authentication of the user, the user may transfer authority 1010 to operate the article to a third party. In some such embodiments, such transfer may be effectuated through a third party login/authorization system (such as, by way of example but not limitation, Facebook Connect; other alternatives will be readily apparent to those skilled in the art) and the article identifier database 204 is updated with the credentials for the third party 1012.

For example, when the article is an electronic device, the user may reduce a luminosity of the device remotely via a client. As another example, the package may be a thermostat, and the user may obtain authorization to obtain data from the thermostat and operate the thermostat remotely after authentication using codes on the package that are submitted to the article operating server by the user. Other examples/embodiments of such remote authentication and operation of article and packages will be readily apparent to those skilled in the art.

In some embodiments, the article can be wearable by a user. By way of example but not limitation, an article may constitute a button embedded into clothing or jewelry, whereby, by pressing the button, a call is immediately placed to an emergency number. In some such embodiments, the user may communicate with the emergency responders audibly, through a microphone/speaker in communication with the event detection system. In some such embodiments, the call is placed directly via the cellular network 200. In other embodiments, a call center talks to the emergency responders based on data delivered from the article.

In an embodiment of the present technology, the event detection system 100 is embedded/attached to a mobile device, such as a cellular phone, laptop, tablet, etc. In some such embodiments, the event detection system 100 can embedded on such device in a manner that is inconspicuous, or that cannot be detached physically from the device without destruction/mutilation of the device. In some such examples, the event detection system 100 communicates over a wireless telecommunications system 200 that is separate from the antenna and communications system of the mobile device. In some such embodiments, the event detection system 100 has an ambient power source separate from that of the mobile device, so that the phone periodically reports its location to the operating server 206, separately from the mobile device itself, so that its location can continue to be tracked in case the mobile device itself is wiped or runs out of power.

In some embodiments, the event detection system 100 is attached to consumer good articles at the time of production, prior to delivery to stores, as a means of theft detection. By way of example but not limitation, the event detection system 100 may be attached to a consumer article, such as an article of clothing, at the time of manufacture, and provisioned with sufficient bandwidth/"talk-time minutes" on a telecommunications network to send its location to the operating server 206 for a period of time that is substantially longer than the expected sales cycle for the consumer good. On initial receipt of a location that is outside of the permitted stores to which the consumer good can be delivered, the operating server can check a database to determine whether or not the article has been sold. If the article has not been sold, a theft alert is generated. Alternative data flows for fraud detection will be apparent to those skilled in the art.

In embodiments of the present technology, an event detection system 100 is provisioned by one or more separate devices/machines prior to delivery of a package to the end user. In some such embodiments, the one or more separate devices scan an address on the package at the time it is provisioned. This may include scanning a printed address via optical character recognition, scanning a bar code, QR code, or other such printed code on the package, and/or detection of the event detection system 100 via electronic communication, such as, by way of example but not limitation, via Near Field Communication. In some such embodiments, the machines update the article identifier database to couple the postal/physical delivery address on the package 101 (or other such identification of the package 101 as may be printed on the package 101 or indicated in the bar code, QR code, or other such code) with an article and/or user identifier in an article identifier database. Other mechanisms for correlating printed information on the package 101 with article identifiers or other information regarding the user or article will be apparent to those skilled in the art. In some embodiments, such separate articles may be operable to adhere and/or enclose the event detection system 100 particular positions on a package, for conformance with design specifications for the package, or to place articles in communication with corresponding icons on the package.

In embodiments of the present technology, the event detection system 100 is utilized to measure and track the interaction of the user with an article or package. In some such embodiments, the event 402 is a proxy indicating an interaction of the user with the article or package. By way of example but not limitation, the event 402 may indicate that the user touched an icon on the package 101, such as, by way of illustrative example but not limitation, a printed "button" on the package 101.

Figure 6:
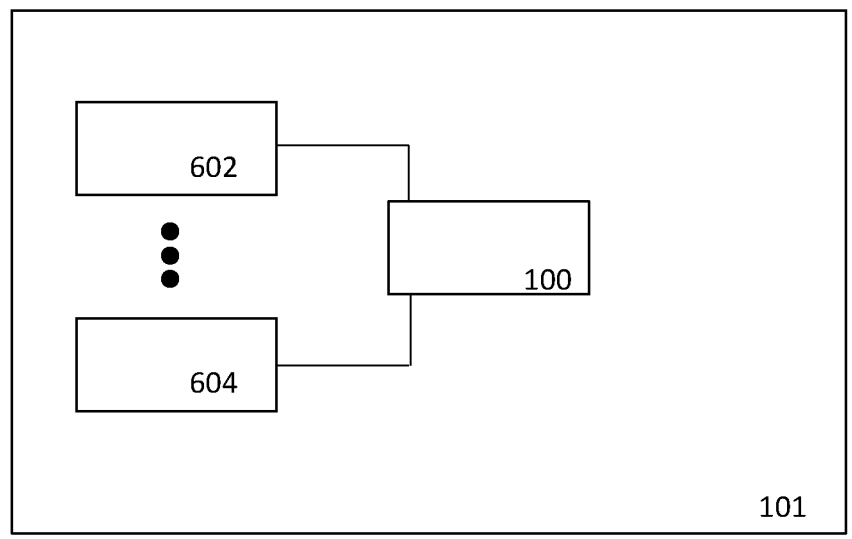
FIG. 6 schematically illustrates coupling between icons on an article and one or more event detection systems, in accordance with some embodiments of the present technology.

As depicted in FIG. 6, a package 101 may have one or more printed icons/sensors 602, 604 that are in communication with one or more event detection systems 100 embedded in the package 101. In some such embodiments, an event is triggered by breaking or completing a circuit by virtue of the user interaction. For example, the event detection system 100 may be configured so that, by virtue of touching the icon 602, 604, a circuit between the power source 102 and the remainder of the event detection system 100. In other embodiments, the event detection system 100 includes touch detection at the icon 602, 604. In other embodiments, the event 402 corresponds to detection of light from the opening of an enclosed package, such as an envelope or box. Many alternative embodiments will be apparent to those skilled in the art.

In embodiments of the present technology, after the event detection system 100 has been authenticated, the occurrence of the event 402 is recorded at one or more operation servers 206, and associated with an identifier of the article or package. In some such embodiments, the operation servers receive and records an identifier for the package 101, one or more identifiers for the event detection systems 100 on the package 101, identifiers for an intended, expected, or authenticated recipient or user of the package 101, the time at which the event 402 occurred, a geo-location for the package 101 at the time of the event 101, as identified automatically through the event detection system 100 (via location parameters determined from the communications system 200, or, in other embodiments, a low-power geo-location system, such as a low-power Global Positing System interface, included in the event detection system 100), a postal address to which the package 101 was sent, purchases or other electronic transactions conducted by interaction with the icons, etc. In some embodiments, such information is stored in one or more databases, which may be relational databases or other distributed databases. In some such embodiments, multiple events and corresponding records are stored and identified with an individual user or physical address.

In some embodiments, following authentication of an article 511, an interchange may elect to decline facilitation of communications between an issuer and the article, based on policies. By way of example but not limitation, such a policy may be based on a geo-location of the device, or a volume of data intended to be transmitted to the device, etc.

In some such embodiments, the packages 101 and icons 602, 604 include marketing or promotional literature or materials. Some such embodiments are utilized for tracking the responses of users to marketing or advertising campaigns. By way of example but not limitation, events recorded in embodiments of the present technology include measuring the opening of envelopes or other packages in response to their contents; the opening or viewing of printed pages (e.g. views of a magazine advertisement); recording and measuring customer responses such as pushing an icon 602 604, which may be depicted as a "button" or may otherwise indicate that part of a package was touched. In some such embodiments, such data may be used for real-time, or asynchronous off-line optimization of marketing campaigns. In embodiments of the present technology, a geo-location of the event detection system 100 at the time of the customer interaction is determined; in some such embodiments, such geo-location data is tracked against the databases 204 to determine whether or not the interaction with the event detection system 100 was by the targeted user. Such determinations may be utilized, by way of example but not limitation, to determine or enhance the accuracy of success rates in direct mail applications.

In some embodiments, such information may be used to determine payments to third parties for marketing/advertising on a package, e.g. paying third parties based upon user interactions with the package or transactions conducted via the package. Such analytics may also include, by way of example but not limitation, determination of success rates for direct mail campaigns. In some embodiments, subsets of the packages 101 may be selected to estimate the applicable statistics by statistical sampling. Other examples of analytics made possible by the present technology will be apparent to those skilled in the art.

In some embodiments of the present technology, the event detection system 100 is operable to communicate with a user via a mobile phone application via a short-range protocol (e.g. NFC, Bluetooth, etc.). In some such embodiments, the event may correspond to a detection by the event detection system 100 that the user's mobile phone is within a certain proximity of the event detection system 100. For example, an event detection system 100 may be embedded in a package 100, whereby the event detection system 100 triggers an event when the event detection system 100 detects via the NFC that a device with a specified identifier is within a distance threshold of the event detection system 100, and the event triggers interaction between the event detection system 100 and the mobile device (e.g., communication of a message from the event detection system 100 to the mobile device via the NFC, for display on the mobile device).

In some embodiments, a package 101 includes two or more components that communicate via an NFC, whereby the event detection system 100 is operative to detect from the NFC signals when such two or more components are physically moved relative to one another. For example, such components may be located on opposite pages of a magazine, such that an event may correspond to a page of the magazine being turned. Alternatively, one such component may be on a detachable part of the package and another component is on a non-detachable portion, whereby the event detection system 100 is operative to detect that the applicable portion of the package has been detached. Other such implementations of multiple short-range radio components within a package will be apparent to those skilled in the art.

In embodiments of the present technology, the event detection system 100 is utilized to conduct electronic commerce transactions via the event detection system 100, i.e., the package 101 may constitute a bill or an invoice, e.g. a cable bill or a credit card bill.

For example, a package in the form of a bill for cable television can include an event detection system 100 sent to a user's home, and can include the icons 602, 604 that indicate options to enable a user to select purchases of cable television packages, which are indicated by the icons 602 604. Also, the package 101 may be a credit card bill, and the icons 602, 604 may indicate whether or not the user approves or wishes to dispute individual payments. In another example, an icon 602, 604 on a credit card bill with an event detection system 100 incorporated therein may be used to indicate whether or not a credit card invoice should be deducted from a user's bank account. In other embodiments of the present technology, the package 101 may be an advertisement, for instance, in a publication such as a magazine, which enables the user to purchase advertised items by touching an icon 602, 604. In some such embodiments, the user's credit card information is stored on or is otherwise accessible by one or more article operating servers 206, and purchases are allowed via the icons 602, 604 after the user has been authenticated. In some such embodiments, communications between the event detection system 100 and the device operating servers 206 in connection with the transaction is conducted via encrypted protocols as described above.

As other examples, the packages 101 may be printed take-out/carry-out menus, or containers for food delivery, such as pizza boxes. In some such embodiments, the user may purchase an item for delivery via touching a corresponding icon 602, 604. In some such embodiments, a delivery service is reached via an operating server 206, which receives an electronic message (e.g. an email, SMS, Twitter message, or other such electronic communication) from the event detection system 100 via the Internet. In other embodiments, the event detection system 100 places a telephone call to via the communications network 200 to the vendor. Some such embodiments may include miniature a microphone and/or speaker that attached to or part of the event detection system 100, and is in communication with the microcontroller 108; the microphone/speaker will be operable at the energies provided by the ambient power source 102, and may be inconspicuous in or visually indistinguishable from the package 101. Also, the microphone or speaker is used for vocal communication with the vendor via the communications network 200. In some such embodiments, the transactions and fulfillment occur only after the postal address to which the package 101 was sent has been authenticated against one or more of the geo-location data from the event detection system 100 and/or an identifier for the user or event detection system 100 that has been authenticated in accordance with embodiments of the present technology. In some examples, the purchased item is delivered in response to event, to the authenticated/validated physical/postal address of the package 101.

Embodiments of the present technology support one-way, two-way, or multi-party vocal messages. In some embodiments of the present technology, the user may click on an icon 602, 604, or activate another event via the package, in order to send an audio message to a predetermined recipient. For example, the recipient may be a vendor or a customer service representative. In embodiments of the present technology, following occurrence of the event, and provided that sufficient power is available from the power source 102, a message is recorded from the user via the microphone on the package 101. In some embodiments, this message is stored at the microprocessor 108 and/or communications processor 104 until there is sufficient power from the power source 102 to send the message via the communications system 200. In some embodiments, the message is sent via the telecommunications system 200 automatically after recording.

In some embodiments, the event establishes direct communication with the recipient via the communications network 200 in real-time, without intermediate storage. In embodiments, the message from the user is forwarded to the recipient as an electronic message, such as an email, SMS, Twitter message, or other similar asynchronous electronic message. In some embodiments, the message is forwarded telephonically. In some embodiments, the communications system 104 in each of several packages 101 sent to different recipients may be pre-loaded with a call-in number of other identifier for a conference call, so that the recipients may establish and/or join the conference call via the telecommunications network 200 by clicking on the icon 602, 604 or through another event at the package. In some embodiments of the present technology, prior to delivery of the package to the end user, charges for expected use of the telecommunications network 200 by the event detection system 100 have been pre-paid.

In embodiments of the present technology, an article or package is mailed to the user and the user is informed (via text on the package) that an event triggered by the user will indicate an assent by the user to a transaction. By way of illustrative example but not limitation, the text may state that the user will be charged for or will otherwise reimburse the postage or other delivery costs for the delivery of the package 101 to the user in the event of the user opening of the package, touching a corresponding icon 602, 604, etc. In some embodiments of the present technology, a message indicating that the user has assented to the charge is sent by the event detection system 100 to the operating server 206, and the user is then charged separately. In other embodiments, upon the occurrence of the event, the user is automatically charged for the reimbursement, for example, by a charge to a credit/debit card or other on-line account that is previously stored for the user for access by the operating server 206.

In some embodiments of the present technology, an article or package is physically mailed with pre-paid postal or delivery charges for return of the article or package to the sender. In some such embodiments, an article identifier for the event detection system 100 may be reutilized for the individual user to whom the article or package was sent, for use in subsequent deliveries to that user. Alternatively, following return of the original article or package, the article identifier can be decommissioned for the original user, and may be returned to a pool of available article identifiers.

In some embodiments, the user may indicate, via interaction with an icon 602 604 or other event, that they are to receive a financial credit or reward on return of the article or package.

In some embodiments, the user can indicate, via the icon 602 604 or other event at the package, that the package is to be collected, and a messenger may be dispatched to the user's location or postal address to collect the package 101 in response. Other variants for arranging return of an article or package via the event detection system 100 will be apparent to those skilled in the art.

Figure 7:
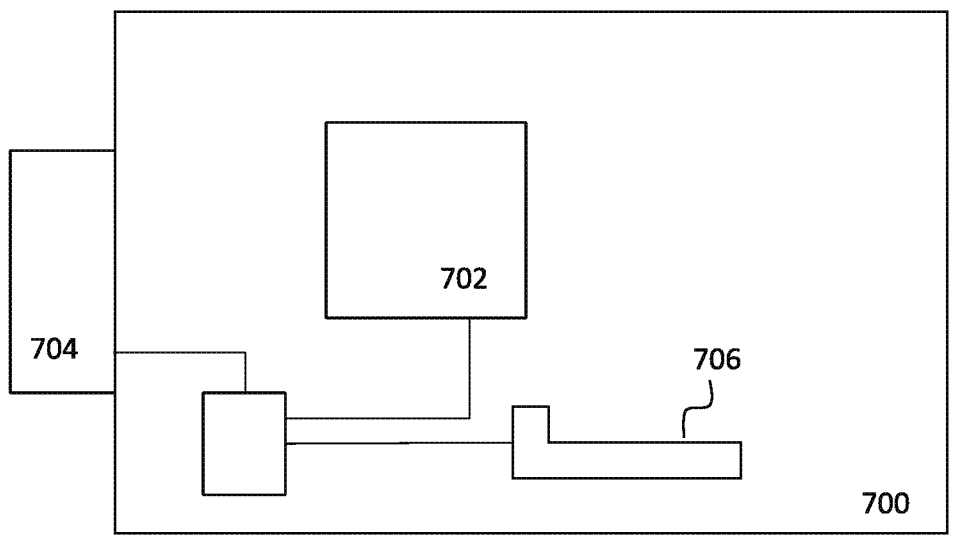
FIG. 7 schematically illustrates a device for providing digital content to a user in lieu of live streaming, in accordance with some embodiments of the present technology.

Embodiments of the present technology comprise a storage device that includes a high-speed wireless cellular connection, whereby the storage device is preloaded with user content, and the device is configured to release the user content by way of the cellular connection. Such embodiments are depicted schematically in FIG. 7. In embodiments of the present technology, the device 700 may be in a small form factor, such as a key fob or memory stick; other suitable form factors will be apparent to those skilled in the art. The device 700 includes one or more high capacity storage media 702, such as, by way of example but not limitation, flash memory. Some embodiments of the present technology include a port 704, which may be utilized for receiving power for the device 700, and/or for transfer of the content resident in the storage media 702 to another device; by way of example but not limitation, the port may be a USB port. The device further includes a cellular communications system 706. The cellular communications system 706 may, by way of example but not limitation, be a 4G system, such as LTE or Mobile WiMax; other alternatives will be apparent to those skilled in the art.

Figure 8:
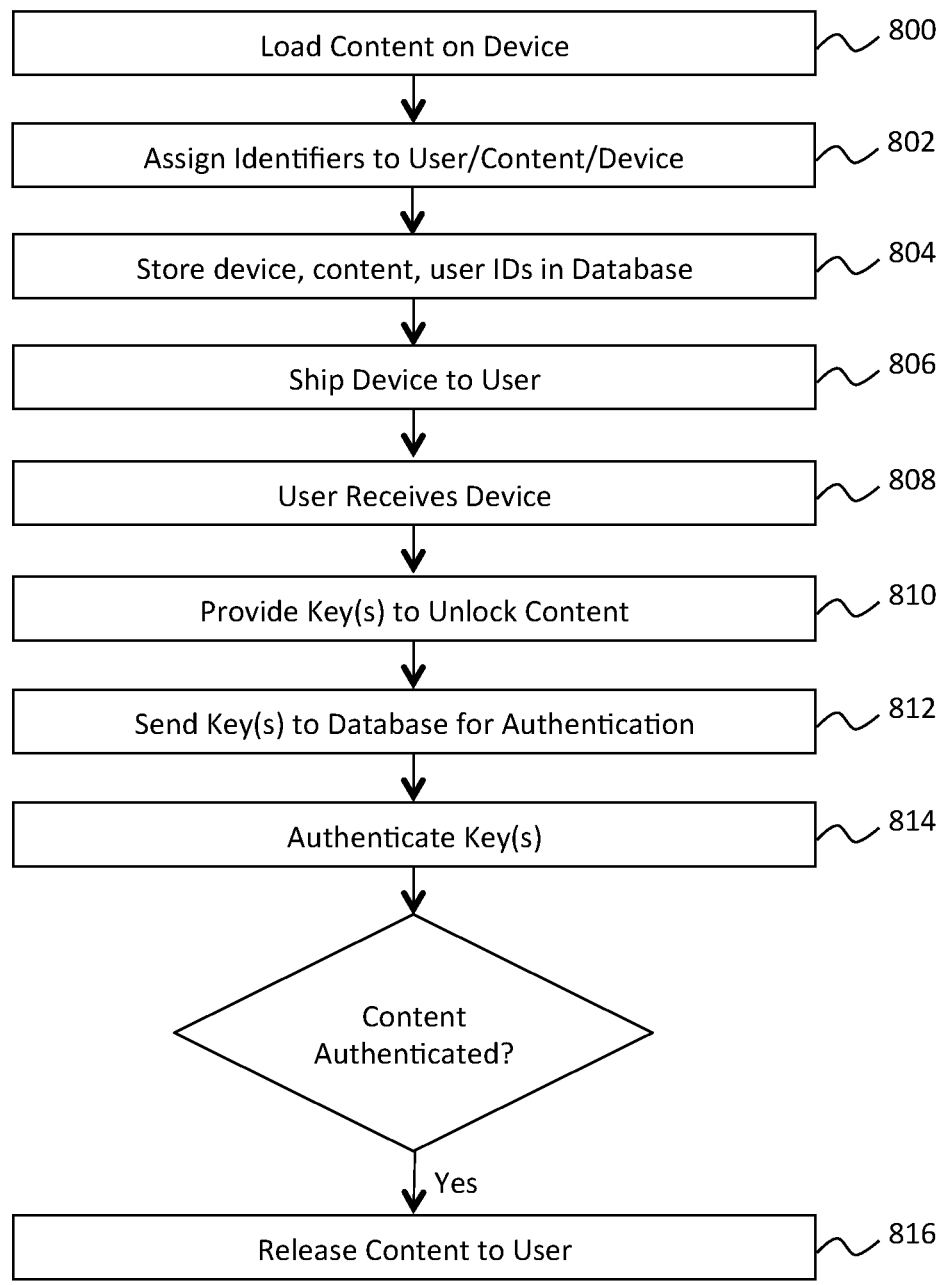
FIG. 8 is a flow chart for provisioning digital content devices, and receiving content from same, in accordance with some embodiments of the present technology.

In embodiments of the present technology, the device 700 is configured to release content to an individual user, by virtue of one or more identifiers associated with the user. In embodiments of the present technology, a user may have content released from the device 700 by provisioning the applicable identifier to the device 700. An example of the provisioning and utilization of the device 700 in accordance with such embodiments is depicted in FIG. 8. At the time of configuration, the device is loaded with one or more pieces of content 800. Such content may be, by way of example but not limitation, movies or other video, songs, books, software, or other digital content that is generally streamed to an end user; other such content which can be delivered to a user by use of the device 700 will be readily apparent to those skilled in the art. As will be apparent to those skilled in the art, remote authentication steps described herein may alternatively be conducted locally on the device 700.

In some embodiments, each such piece of content is associated with an identifier that is unique to the user, the content, and/or the device 802, i.e. public keys. The device, content, and user identifiers are stored in a database 804. The device is then physically shipped to the user 806, associated with a user at the time of purchase or delivery of the device 700 to the user, etc. In some embodiments, the association, or binding, of the identifiers with the device may be conducted via an application running on a user's smartphone, whereby the instance of the application on the user has previously been authenticated. In alternative embodiments, such association/binding of the identifiers with the device 700 occurs at the point of sale, via a point of sale device in communication with the database 204 via the Internet 208.

Following receipt of the device by the user 808, the user may unlock the content on the device by providing the key for the applicable content to the device 810. In some embodiments of the present technology, the key is automatically provided to the device 700 by another device; by way of illustration but not limitation, the ID may be provided by a television in communication with the device via the port 704 or the telecommunications system 706. The key is sent by the device to a central server via the telecommunications system 812. The key is authenticated by a central server 814, and upon authentication, the central server grants a permission to the device 700 to release the applicable content to the user 816. In embodiments of the present technology, contents are continually updated to the device by the central servers via the cellular system 706, for potential later retrieval by a user. In alternative embodiments, the communications system 706 may be a low-bandwidth cellular communications system; in some such embodiments, the communications system is not utilized to update content to the device.

In certain embodiments, the devices are physically returned by the user to receive new content, whether loaded on the same device 700 or sent to the user in a new device 700. Embodiments of the present technology include additional security measures for accessing or releasing content from a device 700.

In embodiments of the present technology, in addition to authentication of the user/device/content identifiers, the geo-location of the device is determined, and the content is only released if the geo-location is approved for such device/content. In embodiments of the present technology, such geolocation authentication is conducted at the remote database 204; in alternative embodiments, the geo-location authentication is performed locally on the device 700. In some embodiments, the geo-location is performed using telecommunications system on the device 700. In alternative embodiments, the geo-location or alternative authentication utilizes short-range radio communications to a user's mobile device; examples of short-range radio protocols that may be used for such location include, by way of example but not limitation NFC, Bluetooth, RFIDs, beacons; etc. In other embodiments, the supplemental security measure may include biometric identification of the user by the device 700.

In embodiments of the present technology, one or more devices 700 are utilized as a virtual local area network. In some such embodiments, each device constitutes a modem that can be attached to, or constitutes part of, hardware that would otherwise be connected to a local area network, such as a server, laptop computer, printer, router, desktop PC, etc. In some such embodiments, all communications amongst such machines, via a local networking protocol such as IEEE 802, or communications between such machines and the Internet, are conducted through the cellular system 708; in some such embodiments, the local communication packets are encapsulated in the communications via the cellular system 710.

In some such embodiments, the devices may also be coupled via a local mesh or other local network, where such local network is utilized solely for communications within the nodes on the network, and not for Internet communications. Embodiments of the present technology utilize the information collected from a user via an article or package 101 to personalize on-line, Internet and mobile-based content to such user; such customization may be conducted off-line or in real-time with the data received via the package 101. For example an online identifier of the user which identifies the user's activities on the World Wide Web or elsewhere on the Internet (such as a persistent identifier stored in a cookie, login usernames for on-line services, mobile phone numbers, or other such on-line identifiers as will be apparent to those skilled in the art) may be correlated with identification of the package in the device identification database 204. Web-based content may be customized for the user based on the data recorded about such user from a triggering event and their other interaction with the event detection system 100. By way of example but not limitation, advertisements or other web-based or mobile content may be selected or customized for the user based on magazine contents that have been viewed by the user, as detected by the event detection system 100 and reported to the operating server 206.

Alternatively, emails, texts, Twitter messages, or other such electronic messages may be sent to a user based on their interaction with the article or package, as detected and communicated by the event detection system 100. By way of example but not limitation, a user may be sent a thank you note following interaction with the event detection system 100. The package 101 may also be used by the end user (actively or passively) to update other records and workflows. By way of example but not limitation, health or insurance records of a user could be updated by way of the user's interaction with the event detection system 100.

In embodiments of the present technology, analytics may be conducted on data sets contained in the database 204 which combine data from the users' on-line activities (e.g., their Web usage) with data regarding such users' interactions with article or packages. For example, the fees charged to advertisers may be based upon delivery or response to Web or mobile based ads served to users as well as response rates from such users to paper-based advertising, as the latter is detected and reported by the event detection system 100. Other examples of integration of feedback of the event detection system 100 with user interactions via separate electronic media will be apparent to those skilled in the art.

In embodiments of the present technology, the actuator 110 may be coupled to mechanisms 116 such as a camera that is operable at the power provided by the supply 102. In some such embodiments, the event detection system 100 is operable to take a picture of the user via the camera 116 when the user opens the package, and then transmit the picture over a wireless network 200. In some such embodiments, the picture is at a low-resolution, transmittable over low-baud rate networks. In embodiments, the picture may be utilized to authenticate the user, or provide proof that the individual opened the package. For example, for confirmation of service of process. Other uses and variants of such a camera will be readily apparent to those skilled in the art.

Some embodiments of the present technology include mechanisms for wirelessly detecting the presence of an article in the vicinity of the detection mechanism, in order to detect the presence of such a mechanism. In some such embodiments, the wireless detector checks for signature wireless transmissions in the vicinity that confirm the presence of an article or package. Such detection may be used by an individual to elect to dispose or destroy an article or package, or to open a package in an area that cannot transmit wireless signals (e.g., a Faraday cage).

In embodiments of the present technology include an application programming interface (API) that allow interactions with the event detection system 100 to be programmed or re-programmed. By way of example but not limitation, the API may allow the interactions from icons 602 604 to be programmed or reprogrammed, and result in different workflows. For example, the API may be utilized to program the event detection system 100 such that differing sequences of interactions with the icons 602, 604 result in different work flows being determined by the device operating servers 206. As another illustrative example, the icons 602, 604 may have the visual effect of numbers on a keypad, and the API may be utilized in a first instance to allow the entry of certain numbers to lock or unlock a remote device that is in communication with the operating servers 206; the API may subsequently utilized in an alternative program/instruction set that may be uploaded to the event detection system 100 via the telecommunications network 200, whereby the revised instructions allow the user to operate an alternative device via the telecommunications network 200. Many other examples of work flows that may be programmed by use of the API in accordance with the present technology will be readily apparent to those skilled in the art.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method for controlling operation of an article, the method comprising:
    associating an article identifier with an article;
    wherein the article comprises a communication system comprising an antenna and a sensor for detecting an interaction event of a plurality of interaction events of one or more users;
    wherein after detection of the interaction event by the sensor, the article is configured to receive, via the antenna, data representing credentials associated with a user from a client device;
    receiving, at a first system, a communication from the article, the communication including the article identifier and credentials associated with the user, wherein the first system performs steps comprising:
        authenticating the article based on the article identifier;
        registering credentials associated with the user; and
        granting authority to enable the user to control operation of the article;
    receiving, via a second system, a request and credentials, from a third-party client device to provide authorization to a third party, representative of a second user, to remotely operate the article;
    granting authority to enable the third party to remotely control operation of the article, wherein the remotely controlling the article comprises tracking an interaction of the user with contents of the article and at least one icon at the article; and
    in response to at least one interaction event caused by the interaction of the user with the at least one icon, initiating at least one transactional event between the user and the third party, wherein initiating the at least one transactional event includes a transfer of payment to a third party associated with the article.

2. The method of claim 1, further comprising sending instructions to the article upon authentication, wherein the instructions control operation of the article.

3. The method of claim 1, further comprising:
    registering credentials for the third party including the article identifier to an article identifier database; and
    transferring authority to the third party to remotely control operation of the article.

4. The method of claim 1, further comprising sending data associated with operation of the article to the client device.

5. The method of claim 1, wherein the interaction event comprises placement of the client device proximal to the article.

6. The method of claim 1, wherein the interaction event comprises an increase in voltage, wherein the increase in voltage is caused by the client device.

7. The method of claim 1, wherein the interaction event comprises a Near Field Communication request.

8. A system comprising:
    a processor; and
    a non-transitory computer-readable medium storing instructions that, when executed by the system, cause the system to:
        associate an article identifier with an article;
        wherein the article comprises a communication system comprising an antenna and a sensor for detecting an interaction event of a plurality of interaction events of one or more users;
        wherein after detection of the interaction event by the sensor, the article is configured to receive, via the antenna, data representing credentials associated with a user from a client device;
        receive, at a first system, a communication from the article, the communication including the article identifier and credentials associated with the user, wherein the first system is configured to:
            authenticate the article based on the article identifier;
            register credentials associated with the user; and
            grant authority to enable the user to control operation of the article;
        receive, via a second system, a request and credentials, from a third-party client device to provide authorization to a third party, representative of a second user, to remotely operate the article;
        grant authority to enable the third party to remotely control operation of the article, wherein the remotely controlling the article comprises tracking an interaction of the user with contents of the article and at least one icon at the article; and
    in response to at least one interaction event caused by the interaction of the user with the at least one icon, initiated at least one transactional event between the user and the third party, wherein initiating the at least one transactional event includes a transfer of payment to a third party associated with the article.

9. The system of claim 8, wherein the instructions further cause the system to send instructions to the article upon authentication, wherein the instructions control operation of the article.

10. The system of claim 8, wherein the instructions further cause the system to:
    register credentials for the third party including the article identifier to an article identifier database; and
    transfer authority to the third party to remotely control operation of the article.

11. The system of claim 8, wherein the instructions further cause the system to send data associated with operation of the article to the client device.

12. The system of claim 8, wherein the interaction event comprises placement of the client device proximal to the article.

13. The system of claim 8, wherein the interaction event comprises an increase in voltage, wherein the increase in voltage is caused by the client device.

14. The system of claim 8, wherein the interaction event comprises a Near Field Communication request.

15. A non-transitory computer-readable medium comprising instructions, the instructions, when executed by a computing system, cause the computing system to:
    associate an article identifier with an article;
    wherein the article comprises a communication system comprising an antenna and a sensor for detecting an interaction event;
    wherein after detection of the interaction event by the sensor, the article is configured to receive, via the antenna, data representing credentials associated with a user from a client device;
    receive, at a first system, a communication from the article, the communication including the article identifier and credentials associated with the user, wherein the first system is configured to:
        authenticate the article based on the article identifier;
        register credentials associated with the user; and
        grant authority to enable the user to control operation of the article;
    receive, via a second system, a request and credentials, from a third-party client device to provide authorization to a third party, representative of a second user, to remotely operate the article;

grant authority to enable the third party to remotely control operation of the article, wherein the remotely controlling the article comprises tracking an interaction of the user with contents of the article and at least one icon at the article; and in response to at least one interaction event caused by the interaction of the user with the at least one icon, initiating at least one transactional event between the user and the third party, wherein initiating the at least one transactional event includes a transfer of payment to a third party associated with the article.

16. The non-transitory computer-readable medium of claim 15, wherein the instructions further cause the computing system to send instructions to the article upon authentication, wherein the instructions control operation of the article.

17. The non-transitory computer-readable medium of claim 15, wherein the instructions further cause the computing system to:

register credentials for the third party including the article identifier to an article identifier database; and transfer authority to the third party to remotely control operation of the article.

18. The non-transitory computer-readable medium of claim 15, wherein the interaction event comprises placement of the client device proximal to the article.

19. The non-transitory computer-readable medium of claim 15, wherein the interaction event comprises an increase in voltage, wherein the increase in voltage is caused by the client device.

20. The non-transitory computer-readable medium of claim 15, wherein the interaction event comprises a Near Field Communication request.

* * * * *